United States Patent [19]
Oh

[11] Patent Number: 5,697,257
[45] Date of Patent: Dec. 16, 1997

[54] FLOATING UNIT DEVICE FOR A ROBOT HAND

[75] Inventor: Sung-min Oh, Suwon, Rep. of Korea

[73] Assignee: Samsung Electronics Co., Ltd., Kyungki-Do, Rep. of Korea

[21] Appl. No.: 550,811

[22] Filed: Oct. 31, 1995

[30] Foreign Application Priority Data

Jan. 11, 1995 [KR] Rep. of Korea ............. 95-395

[51] Int. Cl.$^6$ ................................. G05B 11/00
[52] U.S. Cl. ................... 74/490.06; 74/490.05; 901/29
[58] Field of Search .............. 74/490.01, 490.05, 74/490.06; 901/28, 29, 9, 47; 403/381

[56] References Cited

U.S. PATENT DOCUMENTS

| | | | |
|---|---|---|---|
| 3,535,204 | 10/1970 | Truxa | 403/381 |
| 4,655,674 | 4/1987 | Kohler et al. | 901/29 |
| 4,872,718 | 10/1989 | Nerger | 901/29 |
| 4,954,005 | 9/1990 | Knasel | 901/29 |
| 5,022,645 | 6/1991 | Green | 403/381 |
| 5,433,416 | 7/1995 | Johnson | 403/381 |

Primary Examiner—Charles A. Marmor
Assistant Examiner—David M. Fenstermacher
Attorney, Agent, or Firm—Sughrue, Mion, Zinn, Macpeak & Seas, PLLC

[57] ABSTRACT

A floating unit for a robot hand enables floating operation by a surface-sliding connection between a movable member having a slot portion and a block body inserted into the slot portion of the movable member. A plate member supports the block body and is coupled to a robot arm by a bracket. Sensors are disposed on the plate member and sensor projections are disposed on the moveable member for position detection.

6 Claims, 4 Drawing Sheets

FLOATING UNIT DEVICE FOR A ROBOT HAND

BACKGROUND OF THE INVENTION

1. Field of the Invention

The present invention relates to an industrial robot, and more particularly, to a floating unit device of a robot hand for gripping a workpiece, which is placed between a robot arm and the robot hand and which slidably moves to absorb impact generated during the gripping of the workpiece and to check the gripping state of the workpiece.

2. Description of the Related Art

Generally, a floating unit is installed between the arm of an industrial robot and the hand thereof which has fingers for gripping a workpiece. The floating unit serves as a joint and absorbs any position error generated between the gripped workpiece and the robot hand and prevents an overload force from being applied to the robot arm and workpiece.

FIG. 1 is a sectional view schematically showing an example of a conventional floating unit of a robot hand. The conventional floating unit of the robot hand includes a reversed U-shaped bracket member 11 fixed to the robot arm (not shown), and a pair of sensor supporting members 12 and 12' outwardly coupled to the ends of both legs of bracket member 11 in a symmetrical manner. A cylindrical inner bracket 14 is placed between sensor supporting members 12 and 12' and an upwardly extending ball spline 15 is coupled inside a cylinder block 16 installed above inner bracket 14. The upper end of ball spline 15 is fixed to bracket member 11. A coil spring is installed between bracket member 11 and cylinder block 16 and around ball spline 15. Inner bracket 14, cylinder block 16, ball spline 15 and spring 17 form a coupled body which ascends and descends as a floating device. A block body 18, to which the robot hand (not shown) having fingers for gripping the workpiece is attached, is fixed to the lower end of inner bracket 14, and a pair of sensor projections 19 and 19' for causing sensors 13 and 13' to generate a signal are provided on both sides of block body 18.

In the conventional floating unit of the robot hand having the above-described structure, if a force is applied to block body 18 when the robot hand attached to block body 18 grips the workpiece, the floating device is raised by the operation of ball spline 15. Coil spring 17 mitigates the impact with bracket member 11 by absorbing rising force of the floating device. Simultaneously, sensor projections 19 and 19' placed on both sides of block body 18 cause a signal to be generated by sensors 13 and 13' when they are proximate sensors 13 and 13', so that the robot arm fixed on bracket member 11 is moved to prevent an overload condition.

However, in such a conventional floating unit, the processing of parts, particularly, the processing of the ball spline, is difficult, and thus a great deal if time is required for manufacturing and assembling the parts, so that the manufacturing cost is increased. Also, repair of the conventional device is not easy.

SUMMARY OF THE INVENTION

To solve the above problems, it is an object of the present invention to provide a floating unit for a robot hand which can be easily assembled and repaired and in which the manufacturing cost is reduced.

To achieve the above object, a floating unit of a robot hand according to the present invention, comprises: a bracket member to be fixed to a robot arm; a plate member fixed to one side of the bracket member, and on one side of which a slide guide is placed; sensor supporting members respectively having sensors on one side thereof and symmetrically connected to both sides of the plate member; and a movable member which is slidably connected to the slider guide placed on the plate member.

In the floating unit of the robot hand according to the present invention, that the slide guide preferably is constituted such that a slotted portion of a predetermined depth is formed on the plate member along the longitudinal direction of the plate member and a block body is engaged with the slotted portion to serve as a guide rail. Also, it is preferable that a cross-section of the block body is of a dovetail shape and a slot is formed on a corresponding surface of the movable member, to enable sliding contact with the dovetail-shaped block body. In addition, the slot portion formed on the movable member has at least two steps, so that the block body only partially contacts the slot portion to thereby minimize frictional force.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
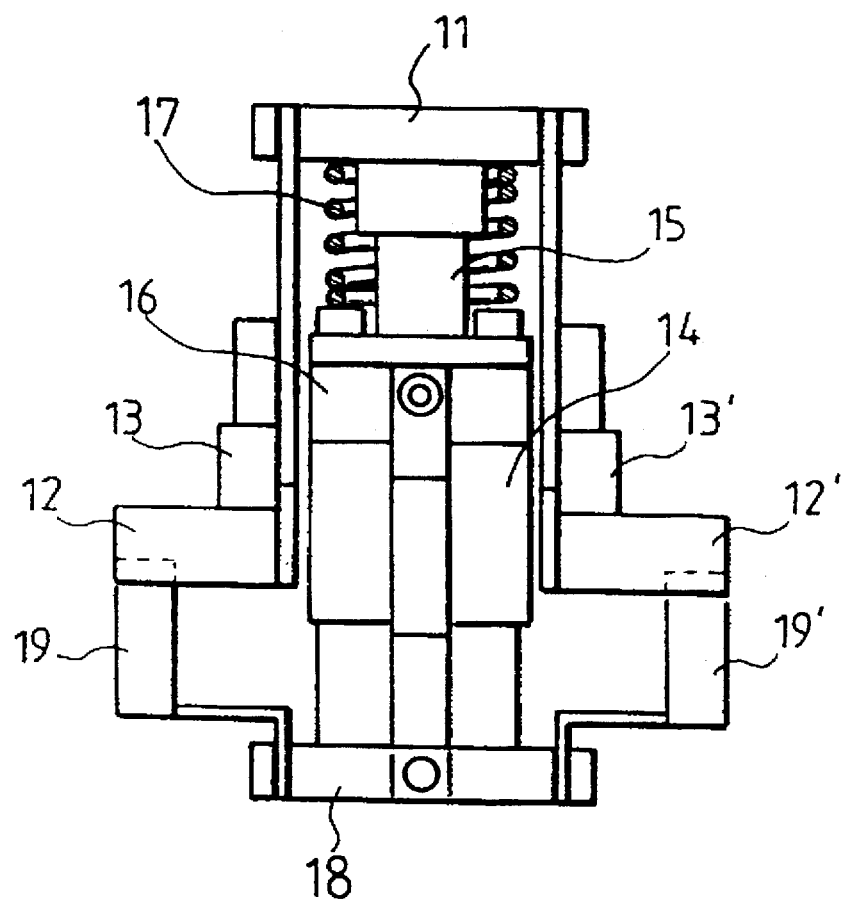
FIG. 1 is a sectional view showing an example of a conventional floating unit of a robot hand.
Figure 2:
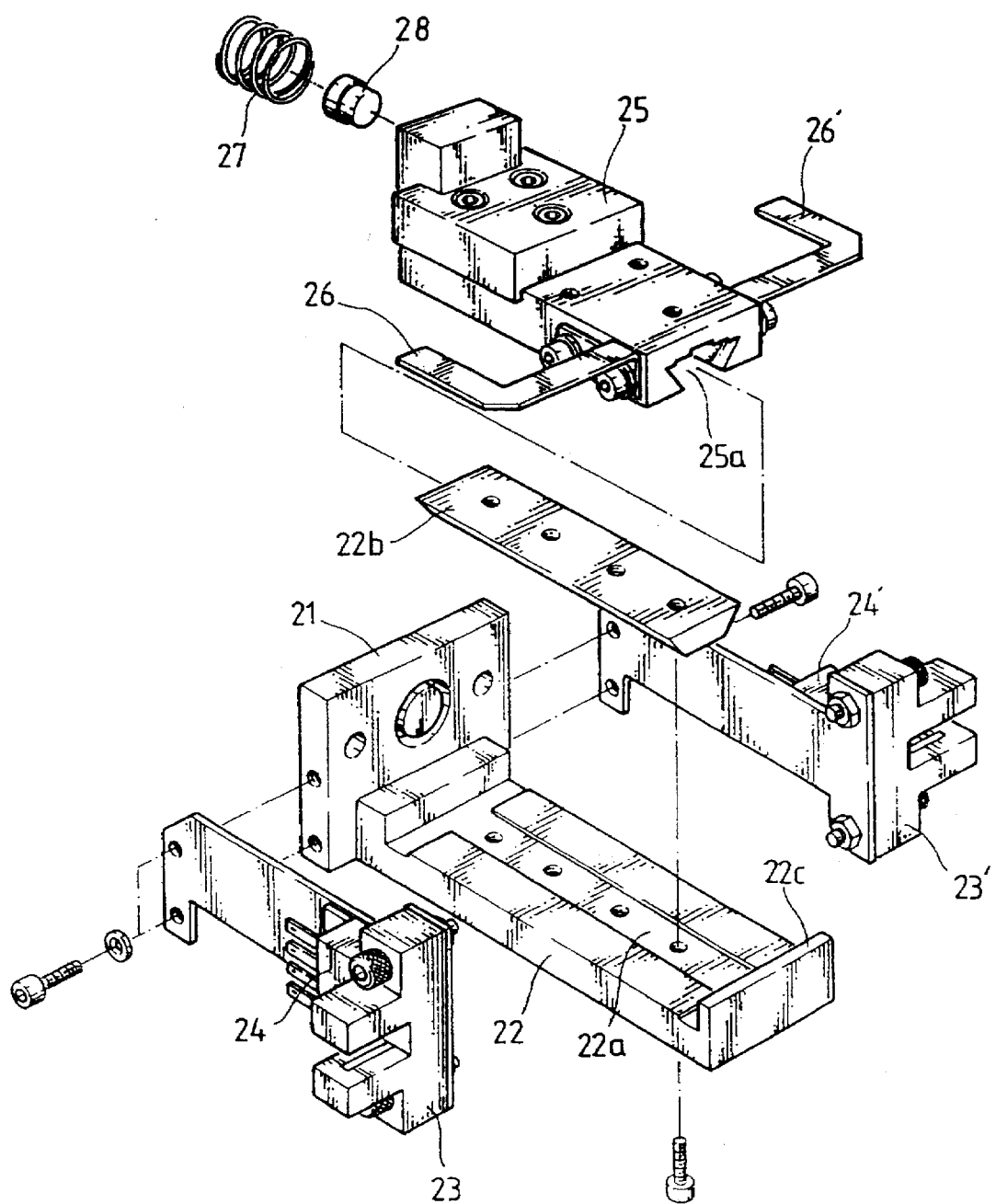
FIG. 2 is a exploded perspective view schematically showing a floating unit for a robot hand according to a preferred embodiment of the present invention.
Figure 3:
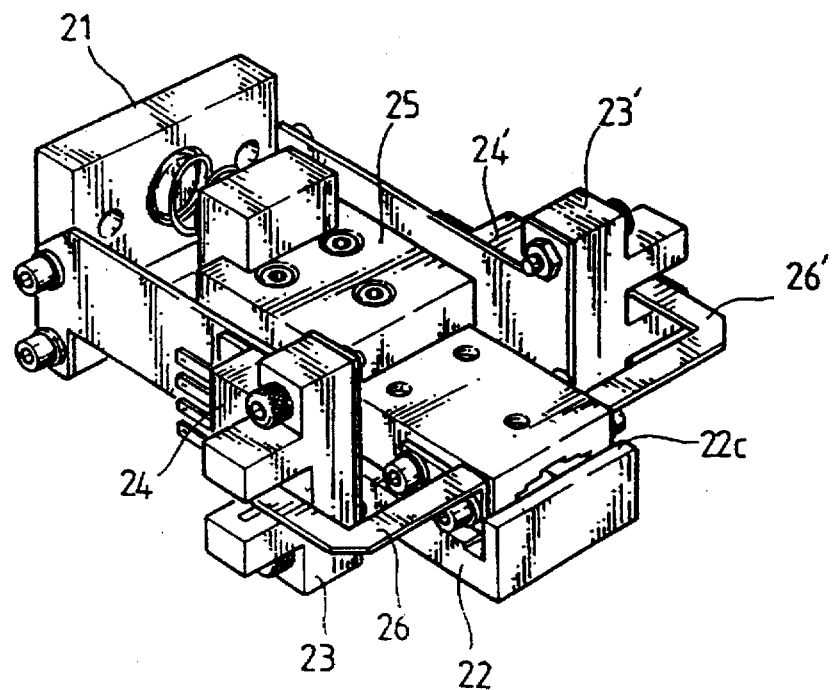
FIG. 3 is an assembled perspective view of the floating unit of the robot hand of FIG. 2.
Figure 4:
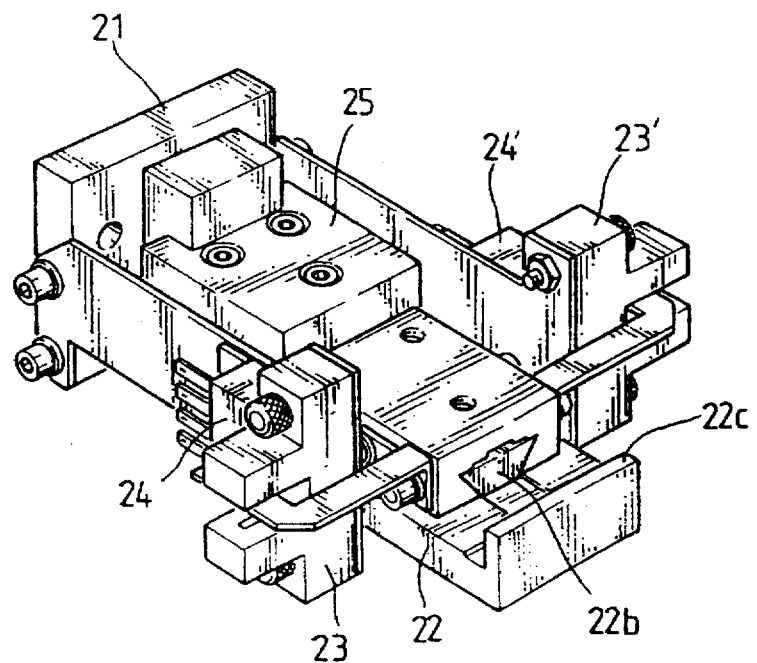
FIG. 4 is a diagram for illustrating the operating state of the floating unit of the robot hand of FIG. 3.
Figure 5:
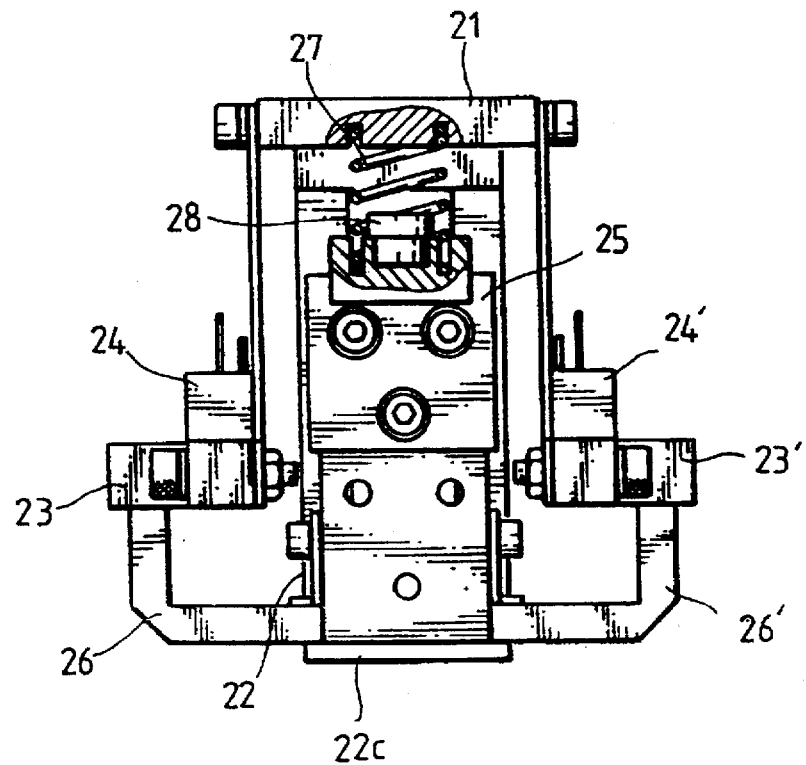
FIG. 5 is a plan view of the floating unit of the robot hand shown in FIGS. 2-4.
Figure 6:
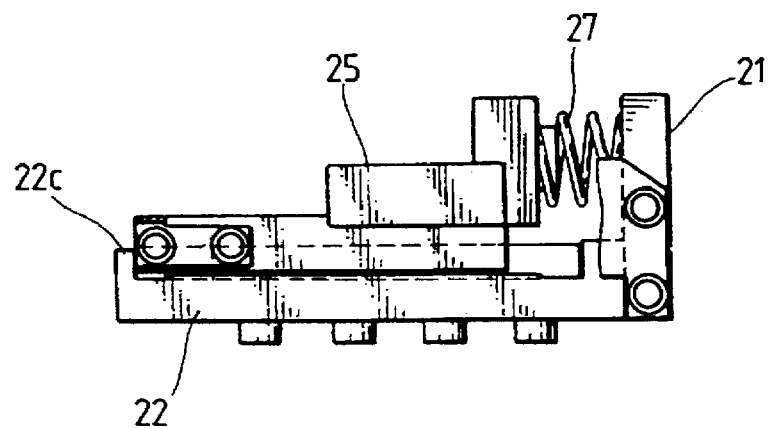
FIG. 6 is a side view of the floating unit device of the robot hand shown in FIGS. 2-5.

Referring to FIGS. 2 to 6, a floating unit of a robot hand according to the preferred embodiment of the present invention includes a bracket member 21 fixed to a robot arm (not shown), and a plate member 22, having a slide guide 22a, disposed to one side of bracket member 21.

Slide guide 22a is a slotted, or recessed, portion of a predetermined depth, formed along the longitudinal direction of plate member 22. A block body 22b is fixedly coupled to the slot forming slide guide 22a by a coupling device, such as screws, to thereby form a guide rail. Also, a pair of sensor supporting members 23 and 23' respectively having sensors 24 and 24' disposed on one side thereof, are symmetrically connected to both sides of bracket member 21 and plate member 22.

In addition, a movable member 25 is slidably coupled to block body 22b. Specifically, a slot portion 25a, slidably engaged with block body 22b is formed on a lower portion of movable member 25 to receive block body 22b. A pair of sensor projections 26 and 26' for causing a signal to be generated by sensors 24 and 24' are symmetrically disposed on both sides of movable member 25. The rear end of movable member 25 (the top left in FIG. 2) is fixedly connected to a robot hand (not shown).

In the preferred embodiment, slide guide 22a is a slot, or recessed portion of a predetermined depth formed along the longitudinal direction of plate member 22, and a block body 22b is fixedly coupled to the slot portion by screws so that block body 22b may act as a guide rail. However, in order to improve assembling efficiency, the guide rail may be formed by interference-fitting, or press fitting, block body 22b in the slide guide 22a. Block body 22b may be also formed integrally with plate member 22.

According to the preferred embodiment, the cross-section of block body 22b is of a dovetail shape. Thus, the cross-section of slot portion 25a which is formed on the lower side of movable member 25 is of a corresponding dovetail shape to receive block body 22b. However, the shape of the cross-section of block body 22b and slot portion 25a of movable member 25 is not limited to the preferred embodiment and may be T-shaped or X-shaped, or any other appropriate shape that permits relative sliding between the two members.

Also, according to the preferred embodiment, slot portion 25a formed on the lower side of movable member 25 has at least two or more steps formed therein, so that only partial contact occurs between an upper surface of block body 22b and an upper surface of slot portion 25a when movable member 25 is slidably connected to block body 22b. This allows lubricant to be supplied to the frictional surfaces and minimizes the area of contact to thereby minimize frictional resistance.

In addition, a protrusion 22c for delimiting a sliding distance of movable member 25 is formed on the front end of plate member 22. The rear end of movable member 25 is elastically biased toward bracket member 21 by a coil spring 27. A shock absorber device 28 such as synthetic resin or rubber plug, is placed on one end of coil spring 27.

In the floating unit of the robot hand according to the preferred embodiment, when the robot hand (not shown) attached to movable member 25 grips the workpiece and accordingly a force is applied to movable member 25, movable member 25 is moved by the relative-sliding between slot portion 25a of movable member 25 and block member 22b. Coil spring 27 absorbs a moving force of movable member 25 to thereby mitigate the impact between bracket member 21 and movable member 25 as movable member 25 moves to the position in FIG. 4. Simultaneously, sensor projections 26 and 26' placed on both sides of movable member 25 cause sensors 24 and 24' to generate a signal when they are close to sensors 24 and 24' so that the robot arm (not shown) fixed to bracket member 21 can be controlled in a known manner based on the signal. For example, movement can be stopped or reversed. Of course, sensors 24 and 24' can be any type of proximity sensor, such as hall effect transducers or photoelectric sensors. Also, there can be only one sensor, or more than two sensors depending on the control system of the robot hand.

As described above, in the floating unit of the robot according to the present invention, the parts are assembled to perform the floating operation by relative sliding between the movable member and block body. This is accomplished by slidably connecting the movable member having the slot portion and the block body received in the slot portion of movable member. As a result, the processing and assembly of the parts is simple, manufacturing cost can be reduced, and repair can be easily performed.

What is claimed is:

1. A floating unit for a robot hand comprising:
   a bracket member adapted to be fixed to a robot arm;
   a substantially planar plate member fixed to one side of said bracket member, a slide guide being on one surface of said plate member;
   a sensor supporting member, having a sensor thereon connected to said plate member; and
   a movable member slidably connected to said slide guide, said movable member having a sensor projection disposed thereon to activate said sensor when said sensor projection is in a desired position, said movable member being adapted to being fixed to said robot hand;
   wherein said slide guide comprises a block body, and a cross-section of said block body is of a dovetail shape and a slot is formed on a corresponding surface of said movable member, to enable sliding contact with said block body while said block body is received in said slot.

2. A floating unit for a robot hand as claimed in claim 1, wherein said slide guide further comprises:
   a slotted portion of a predetermined depth formed in said plate member along the longitudinal direction of said plate member and wherein said block body in engaged with said slotted portion to define a guide rail.

3. A floating unit for a robot hand as claimed in claim 1, wherein said sensor supporting member comprises two sensor portions symmetrically disposed on said plate member, each of said sensor portions having a sensing element disposed thereon, said sensor projection comprising two projections which activate said sensing elements when said projections are in desired positions.

4. A floating unit for a robot hand comprising:
   a bracket member adapted to be fixed to a robot arm;
   a substantially planar plate member fixed to one side of said bracket member, a slide guide being on one surface of said plate member;
   a sensor supporting member, having a sensor thereon connected to said plate member; and
   a movable member slidably connected to said slide guide, said movable member having a sensor projection disposed thereon to activate said sensor when said sensor projection is in a desired position, said movable member being adapted to being fixed to said robot hand;
   wherein said slide guide comprises a slotted portion of a predetermined depth formed in said plate member along the longitudinal direction of said plate member, and a block body engaged with said slotted portion to define a guide rail; and
   wherein a cross-section of said block body is of a dovetail shape and a slot is formed on a corresponding surface of said movable member, to enable sliding contact with said block body while said block body is received in said slot.

5. A floating unit for a robot hand as claimed in claim 4, wherein said slot has two stepped portions that define at least two flat surfaces that lie in parallel offset planes.

6. A floating unit for a robot hand comprising:
   a bracket member adapted to be fixed to a robot arm;
   a substantially planar plate member fixed to one side of said bracket member, a slide guide being on one surface of said plate member;
   a sensor supporting member, having a sensor thereon connected to said plate member; and
   a movable member slidably connected to said slide guide, said movable member having a sensor projection disposed thereon to activate said sensor when said sensor projection is in a desired position, said movable member being adapted to being fixed to said robot hand;

wherein said slide guide comprises a slotted portion of a predetermined depth formed in said plate member along the longitudinal direction of said plate member, and a block body engaged with said slotted portion to define a guide rail;

wherein a cross-section of said block body is of a dovetail shape and a slot is formed on a corresponding surface of said movable member, to enable sliding contact with said block body while said block body is received in said slot; and wherein said slot formed on said movable member has at least two step portions, so that said block body contacts only a portion of a surface of said movable member which defines said slot.

* * * * *